(12) United States Patent
Tezuka (10) Patent No.: US 11,466,974 B2
(45) Date of Patent: Oct. 11, 2022

(54) IMAGE CAPTURING APPARATUS AND MACHINE TOOL

(71) Applicant: FANUC CORPORATION, Yamanashi (JP)

(72) Inventor: Junichi Tezuka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 503 days.

(21) Appl. No.: 16/576,481

(22) Filed: Sep. 19, 2019

(65) Prior Publication Data

US 2020/0149868 A1 May 14, 2020

(30) Foreign Application Priority Data

Nov. 12, 2018 (JP) .............................. JP2018-212075

(51) Int. Cl.
*G01B 11/00* (2006.01)
*G01B 11/03* (2006.01)
*G01B 11/02* (2006.01)

(52) U.S. Cl.
CPC .......... *G01B 11/005* (2013.01); *G01B 11/026* (2013.01); *G01B 11/03* (2013.01)

(58) Field of Classification Search
None
See application file for complete search history.

(56) References Cited

U.S. PATENT DOCUMENTS

| 4,961,155 | A | * | 10/1990 | Ozeki | ........................ | G06T 7/70 |
| | | | | | | 702/152 |
| 7,988,390 | B2 | * | 8/2011 | Shen | ...................... | B23Q 17/22 |
| | | | | | | 409/134 |

(Continued)

FOREIGN PATENT DOCUMENTS

| CN | 101607374 A | 12/2009 |
| CN | 202804813 U | 3/2013 |

(Continued)

OTHER PUBLICATIONS

An Office Action mailed by China National Intellectual Property Administration dated Nov. 18, 2021, which corresponds to Chinese Patent Application No. 201911075052.4 and is related to U.S. Appl. No. 16/576,481 with English language Concise Explanation.

(Continued)

*Primary Examiner* — Rodney E Fuller (74) *Attorney, Agent, or Firm* — Studebaker & Brackett PC (57) ABSTRACT

An image capturing apparatus includes: a coordinate value acquisition unit acquiring first coordinate values serving as position information of a moving target; an image capturing unit capturing an image of the target; a direction and distance calculation unit calculating a direction of an optical axis that connects the target and the image capturing unit and a distance between the target and the image capturing unit on the optical axis based on the first coordinate values and second coordinate values serving as position information of the image capturing unit; an attitude control unit controlling an attitude of the image capturing unit based on the calculated direction of the optical axis; and an imaging magnification setting unit setting an imaging magnification of the target in the image capturing unit based on the calculated distance, wherein the image of the target is captured while changing the imaging magnification and the attitude.

3 Claims, 8 Drawing Sheets

(56) References Cited

U.S. PATENT DOCUMENTS

| | | | | |
|---|---|---|---|---|
| 2005/0154489 A1* | 7/2005 | Sone | ................. | G05B 19/4063 |
| | | | | 700/159 |
| 2016/0334777 A1* | 11/2016 | Sato | ................. | B23Q 17/0909 |
| 2019/0061088 A1* | 2/2019 | Ootou | ............... | B23Q 17/2409 |
| 2019/0064778 A1* | 2/2019 | Nakamura | .......... | G05B 19/416 |
| 2019/0219983 A1* | 7/2019 | Kashihara | .......... | G05B 19/4068 |
| 2021/0372769 A1* | 12/2021 | Eiles | ................... | G01B 11/007 |

FOREIGN PATENT DOCUMENTS

| | | |
|---|---|---|
| CN | 106154975 A | 11/2016 |
| JP | H03-088650 U | 9/1991 |
| JP | H04-017003 A | 1/1992 |
| JP | H04-310106 A | 11/1992 |
| JP | 2001-084031 A | 3/2001 |
| JP | 2002-337041 A | 11/2002 |
| JP | 2013-176822 A | 9/2013 |
| KR | 10-2011-0015731 A | 2/2011 |
| TW | 201003344 A | 1/2010 |

OTHER PUBLICATIONS

An Office Action; "Notice of Reasons for Refusal", mailed by the Japanese Patent Office dated Oct. 27, 2020, which corresponds to Japanese Patent Application No. 2018-212075 and is related to U.S. Appl. No. 16/576,481; with English language translation.

* cited by examiner

IMAGE CAPTURING APPARATUS AND MACHINE TOOL

This application is based on and claims the benefit of priority from Japanese Patent Application No. 2018-212075, filed on 12 Nov. 2018, the content of which is incorporated herein by reference.

BACKGROUND OF THE INVENTION

Field of the Invention

The present invention relates an image capturing apparatus and a machine tool having the same.

Related Art

As cutting processing which uses a machine tool, processing of cutting a workpiece using a tool attached to a tip of a spindle is performed while moving a spindle head. In such cutting processing, a method of imaging a state in which a tool cuts a workpiece with a camera in order to analyze the cause of defective products or defects in a machine has been proposed (for example, see Patent Documents 1 and 2).

Patent Document 1: Japanese Unexamined Patent Application, Publication No. H4-310106
Patent Document 2: Japanese Unexamined Patent Application, Publication No. H4-17003

SUMMARY OF THE INVENTION

In the conventional technology, since an imaging direction and an imaging magnification of a camera are fixed, depending on a position to which the spindle head is moved, the image of a tool serving as the target of imaging may be photographed at a corner of an imaging screen or may deviate from the imaging screen. Moreover, when a spindle head is moved, the distance between the tool and the camera changes and the size of the image of the tool on the screen may become too large or too small.

An object of the present invention is to provide an image capturing apparatus and a machine tool capable of capturing an image of a moving target in an optimal size in a state of being positioned at a central position of a screen.

(1) The present invention provides an image capturing apparatus (for example, an image capturing apparatus 30 to be described later) including: a coordinate value acquisition unit (for example, an information acquisition unit 32 to be described later) that acquires first coordinate values serving as position information of a moving target (for example, a tool 16 to be described later); an image capturing unit (for example, a camera 31 to be described later) that captures an image of the target; a direction and distance calculation unit (for example, a direction and distance calculation unit 33 to be described later) that calculates a direction of an optical axis that connects the target and the image capturing unit and a distance between the target and the image capturing unit on the optical axis on the basis of the first coordinate values and second coordinate values serving as position information of the image capturing unit; an attitude control unit (for example, an attitude control unit 34 to be described later) that controls an attitude of the image capturing unit on the basis of the calculated direction of the optical axis; and an imaging magnification setting unit (for example, an imaging magnification setting unit 35 to be described later) that sets an imaging magnification of the target in the image capturing unit on the basis of the calculated distance, wherein the image of the moving target is captured while changing the imaging magnification of the target and the attitude of the image capturing unit.

(2) The image capturing apparatus according to (1) may further include a length information acquisition unit (for example, an information acquisition unit 32 to be described later) that acquires length information of the target correlated with an identification number of the target, wherein the direction and distance calculation unit may change the first coordinate values on the basis of the length information of the target.

(3) The image capturing apparatus according to (2) may further include a zooming ratio acquisition unit (for example, an information acquisition unit 32 to be described later) that acquires a zooming ratio of the target correlated with the identification number of the target, wherein the imaging magnification setting unit may correct the imaging magnification on the basis of the zooming ratio.

(4) The present invention also provides a machine tool (for example, a machine tool 1 to be described later) including the image capturing apparatus according to any one of (1) to (3).

According to the present invention, it is possible to provide an image capturing apparatus and a machine tool capable of capturing an image of a moving target in an optimal size in a state of being positioned at a central position of a screen.

DETAILED DESCRIPTION OF THE INVENTION

Hereinafter, an embodiment of an image capturing apparatus and a machine tool according to the present invention will be described. All drawings attached to the present specification are conceptual diagrams or schematic diagrams and shapes, scales, vertical-to-horizontal dimensional ratios, and the like of respective portions are changed or exaggerated from actual ones for the sake of understanding.

Figure 1:
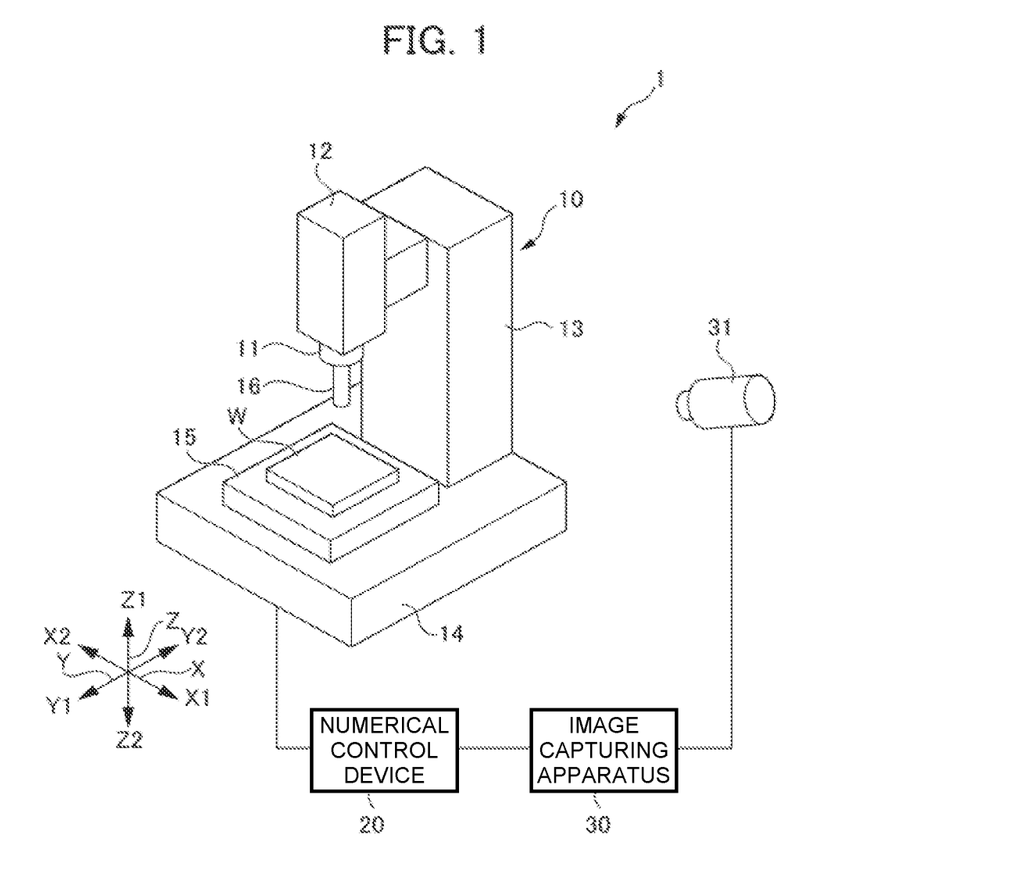
FIG. 1 is a conceptual diagram illustrating a configuration of a machine tool 1 according to an embodiment.

FIG. 1 is a conceptual diagram illustrating a configuration of a machine tool 1 according to the present embodiment. In the present specification and the drawings, X, Y, Z coordinate axes orthogonal to each other are set so that the positions, the moving directions, and the like of members are understood clearly. In these coordinate axes, when the machine tool 1 is seen from a front surface (the side close to a spindle 11 to be described later) in a state in which the machine tool 1 is placed on a horizontal floor (not illustrated), a left-right direction is defined as an X-axis direction, a front-rear direction is defined as a Y-axis direction, and an up-down (vertical) direction is defined as a Z-axis direction. In the X-axis direction, a right-side direction is defined as an X1 direction and a left-side direction is defined as an X2 direction. In the Y-axis direction, a front-side direction is defined as a Y1 direction and a rear-side direction is defined as a Y2 direction. In the Z-axis direction, an upper-side direction is defined as a Z1 direction and a lower-side direction is defined as a Z2 direction. Moreover, in the present specification, a "direction" is also referred to appropriately as a "side".

As illustrated in FIG. 1, the machine tool 1 of the present embodiment includes a machine tool body 10, a numerical control device 20, and an image capturing apparatus 30. The machine tool body 10 includes a spindle 11, a spindle head 12, a column 13, a base portion 14, and a workpiece table 15. The operation of the machine tool body 10 is controlled by the numerical control device 20 (see FIG. 2) to be described later.

<Machine Tool Body 10>

The spindle 11 is a portion that rotates the tool 16 attached to a tool holder (not illustrated) and holds the tool holder to which the tool 16 is attached in a fixed state. A plurality of types of tools 16 are prepared according to the purpose of machining. The respective tools 16 are replaced in a state of being attached to the respective dedicated tool holders. A unique tool number (identification number) is assigned to each tool 16.

The spindle head 12 is a driving mechanism for rotating the spindle 11. The spindle head 12 includes a spindle motor 220 and the like (see FIG. 2) that provides a rotating force to the spindle 11. The spindle motor 220 functions as a spindle motor that rotates continuously at high speed, for example, when cutting processing is performed using a rotating tool attached to the spindle 11. Although not illustrated in the drawings, a tool replacement device for automatically replacing the tool holder attached to the spindle 11 is provided in the spindle head 12. Replacement of tool holders is automatically executed on the basis of a sequence program.

The column 13 is a portion that supports the spindle head 12 so as to be movable in an up-down direction (Z-axis direction). The column 13 includes a lifting mechanism (not illustrated) that moves the spindle head 12 in the up-down direction. In this lifting mechanism, a Z-axis motor 226 for moving the spindle head 12 in the up-down direction in relation to the column 13, an encoder 227 (see FIG. 2), and the like are provided. The operation of the lifting mechanism is controlled by a Z-axis motor control unit 217 (to be described later). The spindle head 12 moves in the up-down direction (Z-axis direction) but does not move in the left-right direction (X-axis direction) and the front-rear direction (Y-axis direction) in relation to the workpiece W.

The base portion 14 is a portion that supports the column 13 and the lifting mechanism (not illustrated). Moreover, the base portion 14 supports the workpiece table 15. The workpiece table 15 is a mechanism that supports the workpiece W so as to be movable in the left-right direction (X-axis direction) and the front-rear direction (Y-axis direction). An X-axis motor 222, a Y-axis motor 224, encoder 223 and 225 (see FIG. 2), and the like are provided in the workpiece table 15. The machine tool body 10 of the present embodiment machines the workpiece W by moving the tool 16 in the Z-axis direction while moving the workpiece W in the X-Y-axis direction.

<Numerical Control Device 20>

Figure 2:
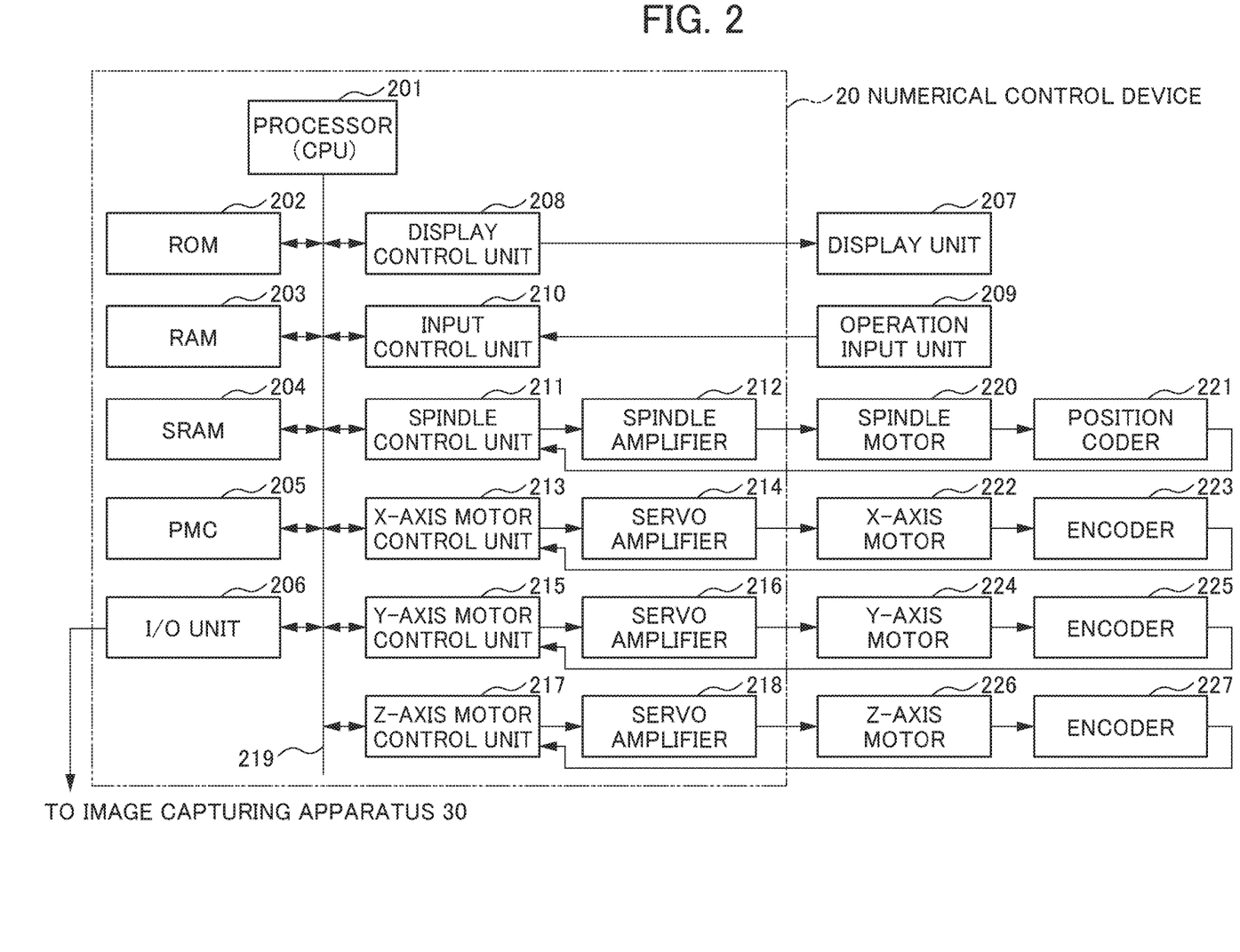
FIG. 2 is a block diagram illustrating an electrical configuration of a machine tool body 10 and a numerical control device 20.

Next, a configuration of the numerical control device 20 that controls the operation of the machine tool body 10 will be described. FIG. 2 is a block diagram illustrating an electrical configuration of the machine tool body 10 and the numerical control device 20. The numerical control device 20 is a device that causes the machine tool body 10 to execute predetermined cutting processing and controls the operation of the lifting mechanism (not illustrated). The numerical control device 20 creates an operation command including movement commands for respective axes and rotation commands to motors driving the respective units on the basis of the sequence program, for example, and transmits the operation command to the machine tool body 10. Using the operation command, the numerical control device 20 controls the motors provided in respective devices to execute the cutting processing of the machine tool body 10.

As illustrated in FIG. 2, the numerical control device 20 includes a processor 201, a ROM 202, a RAM 203, a SRAM 204, a PMC 205, an I/O unit 206, a display unit 207, a display control unit 208, an operation input unit 209, and an input control unit 210. Moreover, the numerical control device 20 includes a spindle control unit 211, a spindle amplifier 212, an X-axis motor control unit 213, a servo amplifier 214, a Y-axis motor control unit 215, a servo amplifier 216, a Z-axis motor control unit 217, and a servo amplifier 218. In the numerical control device 20, the respective units are electrically connected directly or indirectly by a bus 219. Moreover, in the numerical control device 20, the spindle motor 220, a position coder 221, the X-axis motor 222, an encoder 223, the Y-axis motor 224, an encoder 225, the Z-axis motor 226, and an encoder 227 are electrically connected.

The processor (CPU) 201 reads a system program stored in the ROM 202 and controls the entire numerical control device 20 according to the system program. Computation data used by the processor 201, display data, and various pieces of data input by an operator are temporarily stored in the RAM 203. Moreover, for example, information (a length L and a zooming ratio r0) correlated with a tool number, coordinate values (an X-axis coordinate value Xt, a Y-axis coordinate value Yt, and a Z-axis coordinate value Zt) of the tool 16, coordinate values (a X-axis coordinate value Xc, a Y-axis coordinate value Yc, and a Z-axis coordinate value Zc) of the camera 31, and image data obtained by the camera 31 are stored in the RAM 203. At least part of various pieces of data stored in the RAM 203 may be stored in the image capturing apparatus 30 (to be described later). The SRAM 204 is configured as a non-volatile memory in which the stored data is maintained even if the numerical control device 20 is powered off.

The PMC (programmable machine controller) 205 controls the machine tool body 10 according to a procedure, a machining condition, and the like determined by the sequence program stored in the numerical control device 20. The PMC 205 outputs various signals converted by the sequence program to the image capturing apparatus 30 and an external device (not illustrated) via the I/O unit 206. Moreover, the PMC 205 acquires signals input by an operator from the operation input unit 209, performs predetermined signal processing thereon, and delivers the processed signals to the processor 201.

The display unit 207 is a display device capable of displaying various pieces of data, the details of setting, an operation state, and the like. The display control unit 208 controls the content to be displayed on the display unit 207. The operation input unit 209 is a device with which an operator can input various setting data, numerical data, operation instructions, and the like. The operation input unit 209 includes a keyboard, a mouse, a touch panel, and the like (not illustrated), for example. The input control unit 210 acquires data, instructions, and the like input from the operation input unit 209 and stores the same in the RAM 203 and the like.

The spindle control unit 211 controls the rotation of the spindle 11. The spindle control unit 211 receives a spindle rotation command from the processor 201 and outputs a spindle speed signal to the spindle amplifier 212. The spindle amplifier 212 drives the spindle motor 220 at a rotation speed indicated by a spindle speed signal. The position coder 221 outputs a returning pulse synchronized with rotation of the spindle motor 220 to the spindle control unit 211. The spindle control unit 211 performs feedback control of the speed of the spindle motor 220 on the basis of the returning pulse output from the position coder 221.

The X-axis motor control unit 213 controls the movement in the left-right direction (X-axis direction) of the workpiece table 15. The X-axis motor control unit 213 receives a movement amount command value from the processor 201 and outputs a torque command value to the servo amplifier 214. The servo amplifier 214 supplies a driving current to the X-axis motor 222 according to a torque command value output from the X-axis motor control unit 213. The encoder 223 detects the position and the speed of the X-axis motor 222 to output position and speed feedback signals to the X-axis motor control unit 213. The X-axis motor control unit 213 performs feedback control of the position and the speed of the X-axis motor 222 on the basis of the position and speed feedback signals output from the encoder 223. With this feedback control, the position in the left-right direction (X-axis direction) of the workpiece table 15 is adjusted.

The Y-axis motor control unit 215 controls the movement in the front-rear direction (Y-axis direction) of the workpiece table 15. Since the process of the Y-axis motor control unit 215 controlling the operation of the Y-axis motor 224 is similar to that of the X-axis motor control unit 213, the description thereof will be omitted. The Y-axis motor control unit 215 performs feedback control of the position and the speed of the Y-axis motor 224. With this feedback control, the position in the front-rear direction (Y-axis direction) of the workpiece table 15 is adjusted.

The Z-axis motor control unit 217 controls the movement in the up-down direction (Z-axis direction) of the spindle head 12 in the lifting mechanism (not illustrated) of the spindle head 12. Since the process of the Z-axis motor control unit 217 controlling the operation of the Z-axis motor 226 provided in the spindle head 12 is similar to that of the X-axis motor control unit 213, the description thereof will be omitted. The Z-axis motor control unit 217 performs feedback control of the position and the speed of the Z-axis motor 226. With this feedback control, the position in the up-down direction (Z-axis direction) of the spindle head 12 is adjusted.

<Imaging Apparatus 30>

Figure 3:
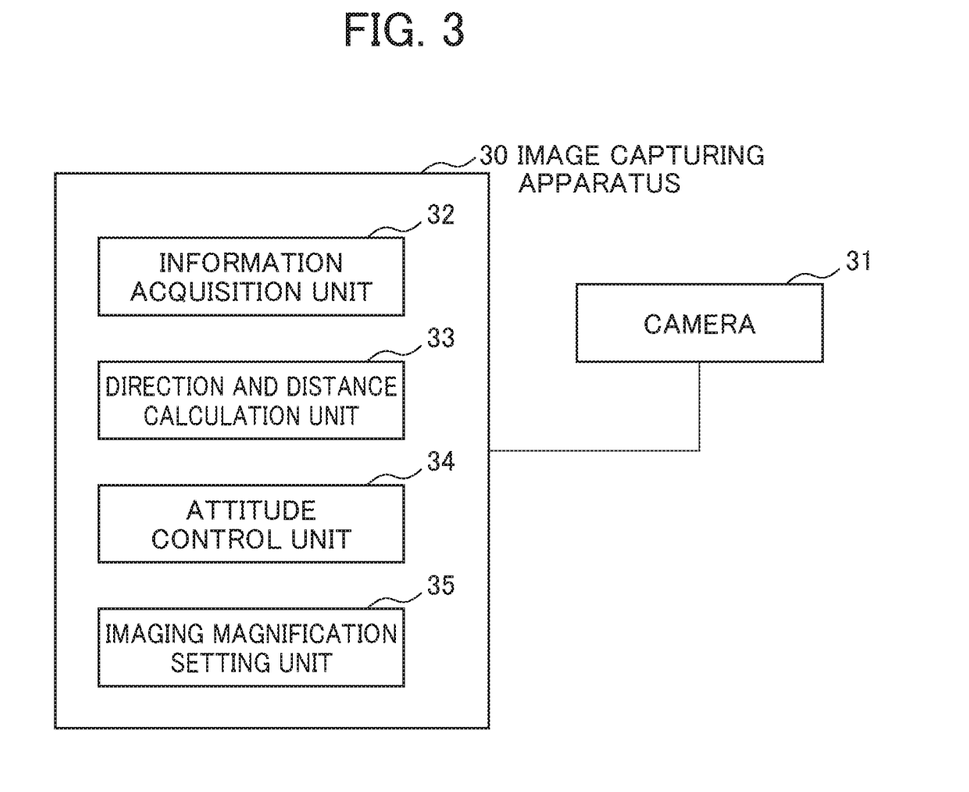
FIG. 3 is a block diagram illustrating an electrical configuration of an image capturing apparatus 30.
Figure 4A:
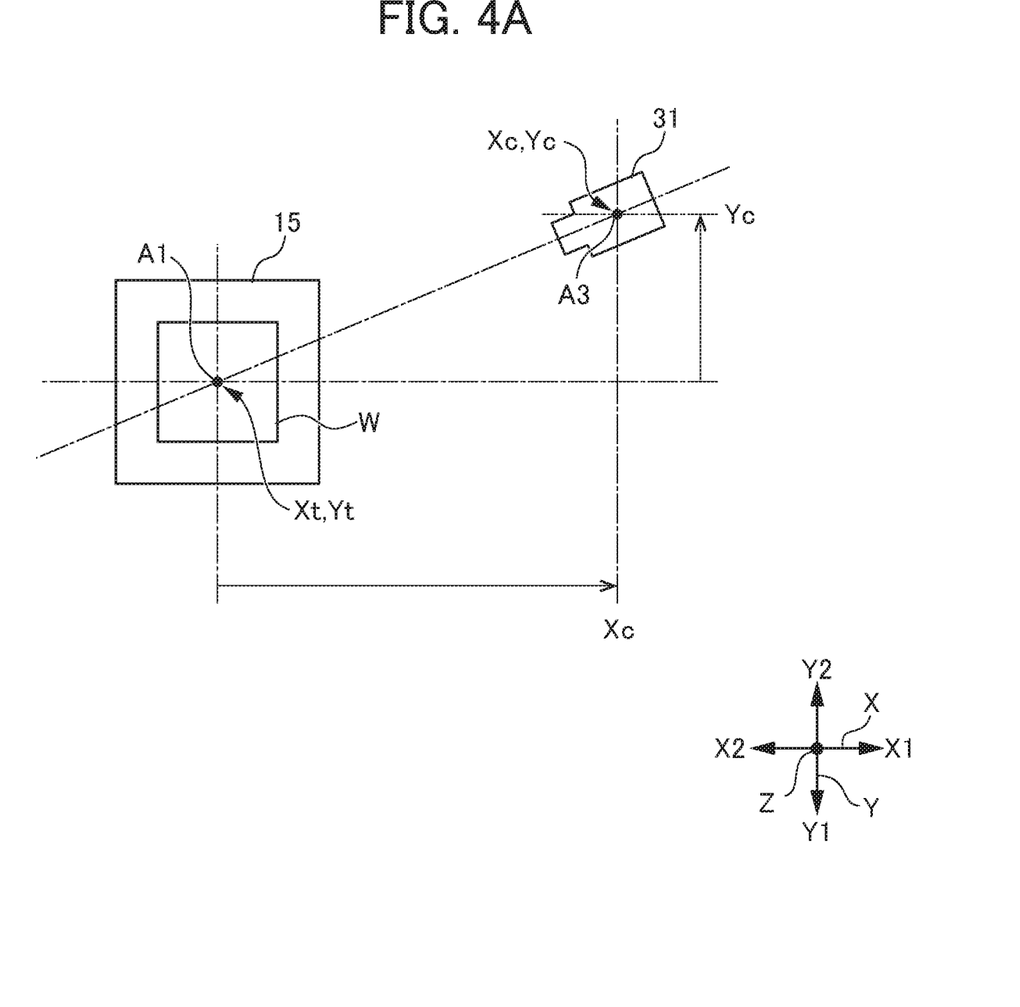
FIG. 4A is a plan view schematically illustrating a positional relation between a tool 16 and a camera 31.
Figure 4B:
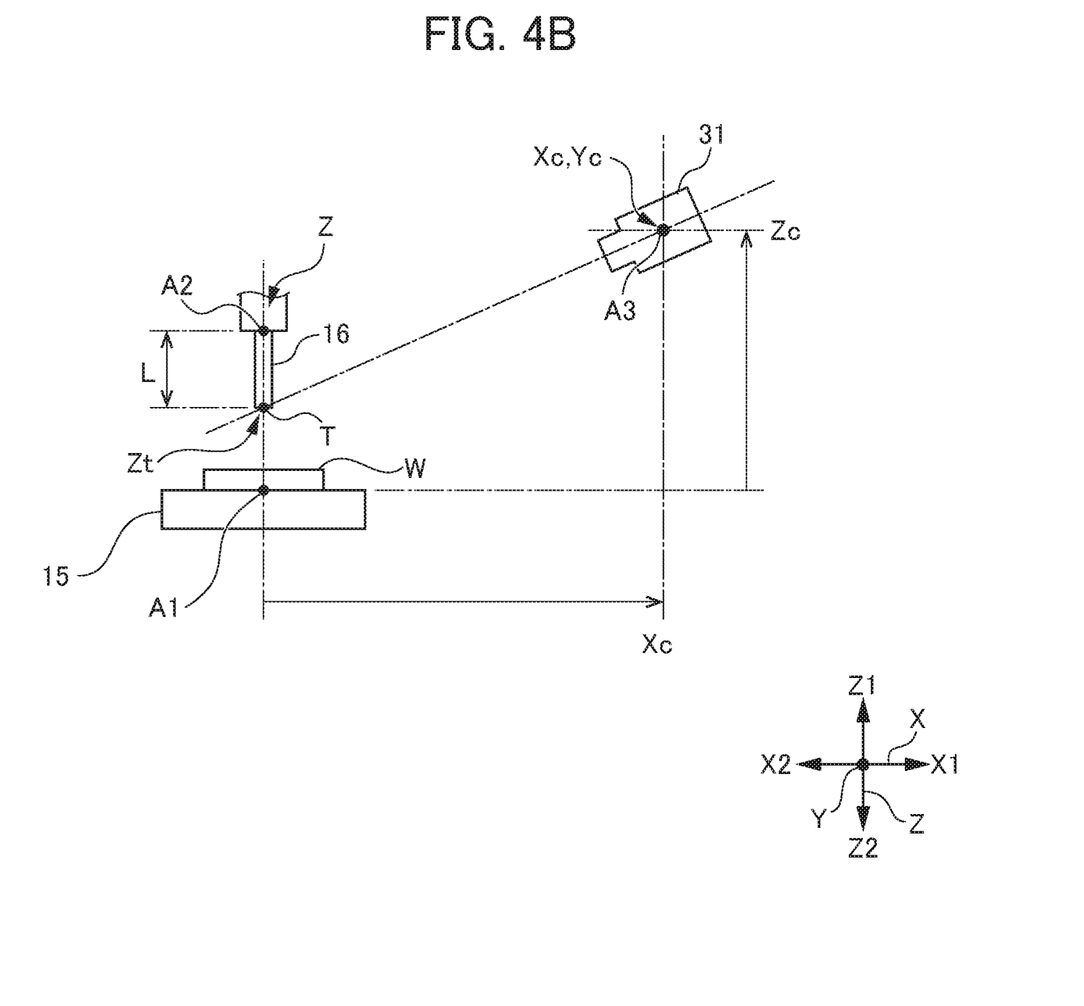
FIG. 4B is a side view schematically illustrating a positional relation between the tool 16 and the camera 31.
Figure 5:
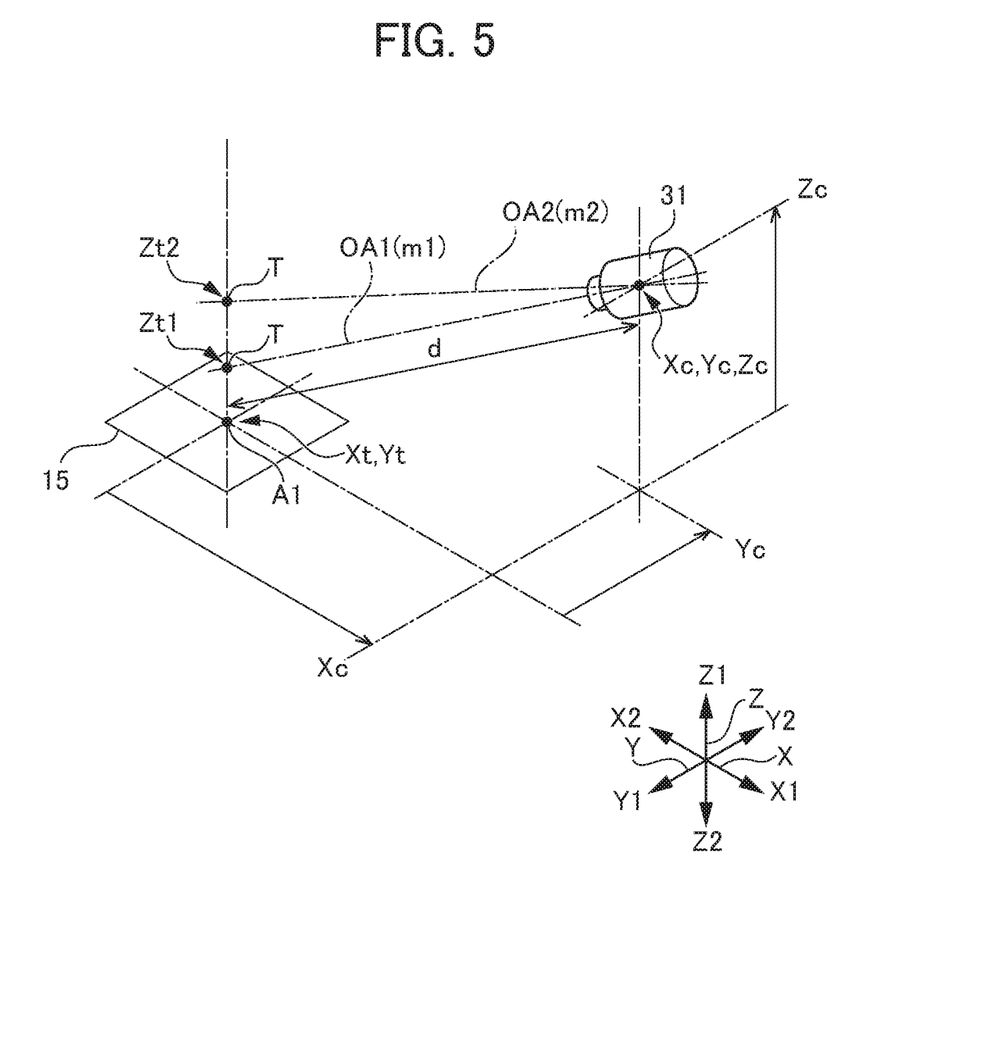
FIG. 5 is a perspective view schematically illustrating a positional relation between the tool 16 and the camera 31.

Next, a configuration of the image capturing apparatus 30 will be described. FIG. 3 is a block diagram illustrating an electrical configuration of the image capturing apparatus 30. FIG. 4A is a plan view schematically illustrating a positional relation between the tool 16 and the camera 31. FIG. 4B is a side view schematically illustrating a positional relation between the tool 16 and the camera 31. FIG. 5 is a perspective view schematically illustrating a positional relation between the tool 16 and the camera 31. As illustrated in FIG. 3, the image capturing apparatus 30 includes the camera (an image capturing unit) 31, an information acquisition unit (a coordinate value acquisition unit, a length information acquisition unit, and a zooming ratio acquisition unit) 32, a direction and distance calculation unit 33, an attitude control unit 34, and an imaging magnification setting unit 35.

The camera 31 is a device (a video camera) that captures an image of a state in which the tool 16 (a target) attached to the spindle 11 machines the workpiece W. An imaging magnification of the camera 31 (to be described later) can be changed by adjusting a zooming ratio. The attitude of the camera 31 is controlled by the attitude control unit 34 (to be described later) in a state in which a central position (a reference point A3 to be described later) in the X, Y, Z-axis directions is fixed. When the attitude of the camera 31 is controlled, the direction of an optical axis of the camera 31 is adjusted. A image (video) captured by the camera 31 is transmitted to the numerical control device 20 via the body of the image capturing apparatus 30 and is stored in the RAM 203 (see FIG. 2). The camera 31 may be a device (a still camera) that captures a still image.

The information acquisition unit 32 acquires coordinate values, a tool number (an identification number), and various pieces of information correlated with the tool number. The information acquisition unit 32 is a coordinate value acquisition unit and acquires first coordinate values serving as the position information of the tool 16 moving in the up-down direction (Z-axis direction). As illustrated in FIG. 4B, the first coordinate values of the tool 16 are the position of the tip T of the tool 16. The first coordinate values of the tool 16 are represented by an X-axis coordinate value Xt, a Y-axis coordinate value Yt, and a Z-axis coordinate value Zt about a reference point A1 of the workpiece table 15. The X-axis coordinate value Xt and the Y-axis coordinate value Yt among the first coordinate values of the tool 16 are identical to the reference point A1 of the workpiece table 15 in a plan view as illustrated in FIG. 4A. The information acquisition unit 32 acquires the first coordinate values of the tool 16 from the RAM 203 (the numerical control device 20).

As described above, the spindle head 12 does not move in the left-right direction (X-axis direction) and the front-rear direction (Y-axis direction) in relation to the workpiece W. Therefore, in a plan view of the machine tool 1, the X-axis coordinate value Xt and the Y-axis coordinate value Yt of the tool 16 are fixed values (0,0). On the other hand, the Z-axis coordinate value Zt changes when the spindle head 12 moves in the up-down direction (Z-axis direction) and the tool 16 is replaced. For example, when the tool 16 is replaced, the position in the Z-axis direction of the tool 16 (the tip T) changes according to the length L of the tool 16. In case of a machine tool in which the spindle head 12 moves in the left-right direction (X-axis direction) and the front-rear direction (Y-direction) in relation to the workpiece W, the X-axis coordinate value Xt and the Y-axis coordinate value Yt are the value of a distance from the reference point A1 of the workpiece table 15.

The Z-axis coordinate value Zt is represented by the height from the reference point A1 of the workpiece table 15. As illustrated in FIG. 4B, when the coordinate value in the Z-axis direction of the reference point A2 of the spindle head 12 is Z and the length of the tool 16 is L, the Z-axis coordinate value Zt of the tip T is obtained as Z-L. The coordinate value Z of the spindle head 12 is acquired real-time as the position information in the Z-axis direction of the spindle head 12 by the information acquisition unit 32.

The information acquisition unit 32 is a length information acquisition unit and acquires the length L of the tool 16 correlated with the tool number (identification number) of the tool 16. The direction and distance calculation unit 33 (to be described later) changes the Z-axis coordinate value Zt of the first coordinate values on the basis of the length L of the tool 16 acquired by the information acquisition unit (length information acquisition unit) 32.

The information acquisition unit 32 is a zooming ratio acquisition unit and acquires a zooming ratio r0 of the tool 16 correlated with the tool number (identification number) of the tool 16. The information acquisition unit 32 retrieves information stored in the RAM 203 (the numerical control device 20) on the basis of the tool number designated by the sequence program and acquires the length L and the zooming ratio r0 as the information on the tool 16 correlated with the tool number.

The direction and distance calculation unit 33 calculates the direction of an optical axis OA connecting the camera 31 and the tip of the tool 16 and the distance d between the camera 31 and the tip T of the tool 16 on the optical axis OA on the basis of the first coordinate values (an X-axis coordinate value Xt, a Y-axis coordinate value Yt, and a Z-axis coordinate value Zt) of the tool 16 and second coordinate values (an X-axis coordinate value Xc, a Y-axis coordinate value Yc, and a Z-axis coordinate value Zc) serving as the position information of the camera 31.

As illustrated in FIGS. 4A and 4B, the second coordinate values (an X-axis coordinate value Xc, a Y-axis coordinate value Yc, and a Z-axis coordinate value Zc) representing a reference point A3 of the camera 31 are represented by the coordinate values from the reference point A1 of the workpiece table 15. The camera 31 is fixed to the reference point A3 serving as the central position in the X, Y, Z-axis directions. Therefore, the X-axis coordinate value Xc, the Y-axis coordinate value Yc, and the Z-axis coordinate value Zc are fixed values.

The direction and distance calculation unit 33 calculates the direction of the optical axis OA connecting the camera 31 and the tip T of the tool 16 as a direction vector m by Equation (1) below.

$$m = (Xt-Xc, Yt-Yc, Zt-Zc) \quad (1)$$

As illustrated in FIG. 5, when the tip T of the tool 16 (see FIG. 4B) is present at a Z-axis coordinate value Zt1, the optical axis is the direction (direction vector m1) of an optical axis OA1. Moreover, when the tip T of the tool 16 moves upward (Z1 side) from the Z-axis coordinate value Zt1 and is present at a Z-axis coordinate value Zt2, the optical axis is the direction (direction vector m2) of an optical axis OA2. Moreover, the direction and distance calculation unit 33 calculates the distance d (see FIG. 5) between the camera 31 and the tip T of the tool 16 by Equation (2) below.

$$d = 1l((Xt-Xc)^2 + (Yt-Yc)^2 + (Zt-Zc)^2) \quad (2)$$

The distance d is used when the imaging magnification setting unit 35 (to be described later) sets an imaging magnification of the tool 16.

The attitude control unit 34 controls the attitude of the camera 31 so as to be parallel to the optical axis OA direction (the direction vector m) calculated by the direction and distance calculation unit 33. For example, as illustrated in FIG. 5, when the tip T of the tool 16 is present at the Z-axis coordinate value Zt1, the direction of the optical axis OA1 connecting the camera 31 and the tip T of the tool 16 is calculated as the direction vector m1 by substituting fixed values to the X-axis coordinate value Xc, the Y-axis coordinate value Yc, and the Z-axis coordinate value Zc and substituting Zt1 in the Z-axis coordinate value Zt in Equation (1).

When the attitude control unit 34 controls the attitude of the camera 31 so as to be parallel to the direction of the optical axis OA1, the center of the screen can be made identical to the position of the image of the tip T of the tool 16 in the image captured by the camera 31. The control of the attitude and the imaging magnification (to be described later) of the camera 31 performed by the attitude control unit 34 is performed at intervals of 100 ms, for example. With the control, the camera 31 can continuously capture the image of the tip T of the moving tool 16 in a state in which the image is positioned at the center of the screen.

The imaging magnification setting unit 35 calculates the imaging magnification r of the tool 16 by the camera 31 by Equation (3) below.

$$r = d/d0 \quad (3)$$

Here, d is the distance calculated by Equation (2). d0 is a reference distance when the imaging magnification is "1" and is different from one tool to another. The value of the reference distance d0 is set such that the image of the tool 16 has an optimal size on the screen when the tool 16 is imaged at the reference distance d0. When the distance d between the camera 31 and the tool 16 (the tip T) is smaller than the reference distance d0, since the imaging magnification r decreases, it is possible to prevent the image of the tool 16 from becoming excessively large on the screen. Moreover, when the distance d between the camera 31 and the tool 16 (the tip T) is larger than the reference distance d0, since the imaging magnification r increases, it is possible to prevent the image of the tool 16 from becoming excessively small on the screen. The reference distance d0 may be a fixed value for all tools 16. Moreover, the reference distance d0 may be changed by an operator via the operation input unit 209 (see FIG. 2).

Figure 6A:
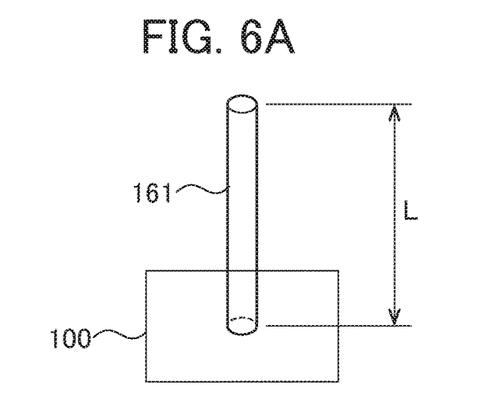
FIG. 6A is a diagram for describing a relation between a tool shape and an imaging magnification.
Figure 6B:
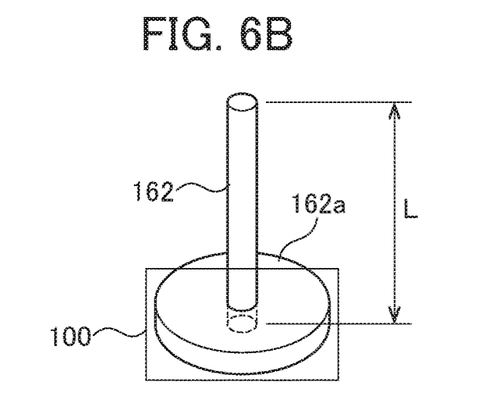
FIG. 6B is a diagram for describing a relation between a tool shape and an imaging magnification.
Figure 6C:
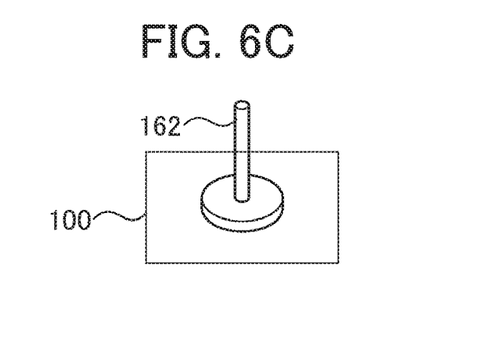
FIG. 6C is a diagram for describing a relation between a tool shape and an imaging magnification.

The imaging magnification setting unit 35 corrects the imaging magnification r on the basis of the zooming ratio r0 of the tool 16 acquired by the information acquisition unit 32. The correction of the imaging magnification r is executed according to a tool diameter, a tip shape, and the like of the tool 16. Therefore, the imaging magnification r may not be corrected depending on the type of the tool 16. FIGS. 6A to 6C are diagrams for describing the relation between the imaging magnification and the tool shape. In FIGS. 6A to 6C, a frame 100 indicates the size of a screen imaged by the camera 31. In the respective diagrams, it is assumed that the size of the frame 100 is the same.

A tool 161 illustrated in FIG. 6A and a tool 162 illustrated in FIG. 6B have the same length L. However, the tool 162 illustrated in FIG. 6B has a disc-shaped edge 162a at a tip thereof. Therefore, when the tool 162 is imaged at the same imaging magnification as the tool 161, the image of the tool 162 appears too large on the screen as illustrated in FIG. 6B. Therefore, the imaging magnification setting unit 35 corrects the imaging magnification r on the basis of the zooming ratio r0 acquired for the tool 162. The zooming ratio r0 of a tool is set as in Table 1 below, for example.

TABLE 1

| TOOL NUMBER | ZOOMING RATIO (r0) |
|---|---|
| 1 | 1.0 |
| 2 | 0.4 |

In Table 1, tool number 1 corresponds to the tool 161 in FIG. 6A. Tool number 2 corresponds to the tool 162 in FIG. 6B. Data that correlates the tool number and the zooming ratio illustrated in Table 1 is stored in the RAM 203 (see FIG. 2). The imaging magnification setting unit 35 acquires "0.4" as the zooming ratio r0 of tool number 2 by referring to the data illustrated in Table 1. The data that correlates the tool number and the zooming ratio illustrated in Table 1 is an example, and data that correlates the tool number and the zooming ratio for more tools may be stored.

Subsequently, the imaging magnification setting unit 35 calculates the corrected imaging magnification r by Equation (4) below.

$$r = r0 \times d/d0 \quad (4)$$

The image of the tool 162 of which the imaging magnification r is corrected has an optimal size on the screen as illustrated in FIG. 6C. The zooming ratio r0 may be corrected so that the imaging magnification r increases as well as the imaging magnification r decreases. For example, when the tool diameter is smaller even if the tool length L is the same, the zooming ratio is set to 1.5, for example. In this case, the imaging magnification setting unit 35 corrects the imaging magnification r so as to increase. The imaging magnification setting unit 35 controls the zooming ratio of the camera 1 on the basis of the imaging magnification r calculated finally.

Figure 7:
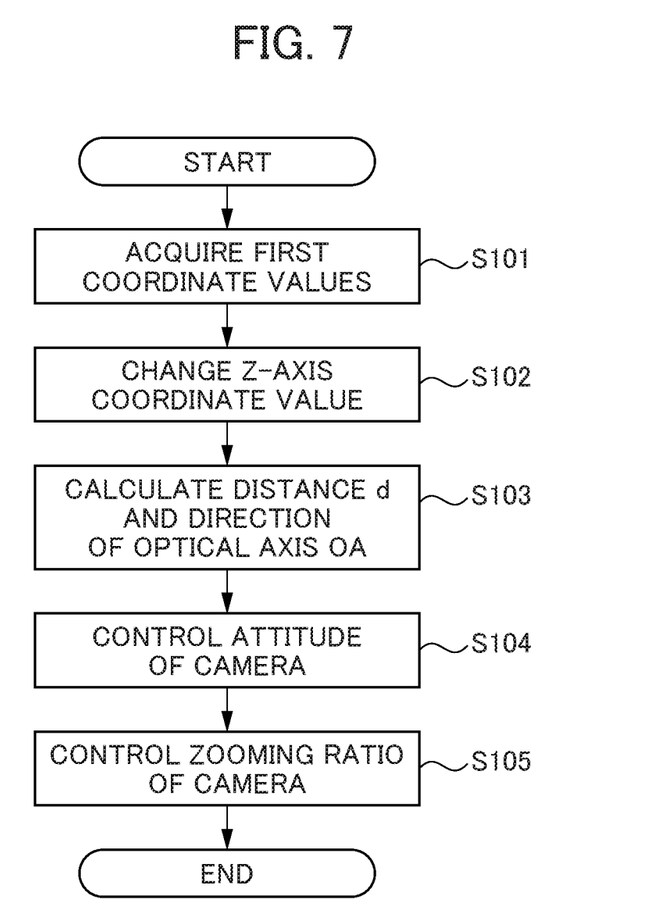
FIG. 7 is a flowchart illustrating a process of controlling an attitude and an imaging magnification of the camera 31 executed by the image capturing apparatus 30.

Next, the control of the attitude and the imaging magnification of the camera 31 in the image capturing apparatus 30 according to the present embodiment will be described. FIG. 7 is a flowchart illustrating a process of controlling the attitude and the imaging magnification of the camera 31 executed by the image capturing apparatus 30. The imaging of the tool 16 by the camera 31 is executed by a general imaging program of the image capturing apparatus 30 except for the control of the attitude and the imaging magnification. The process of controlling the attitude and the imaging magnification of the attachment member 31 described below is executed every 100 ms, for example.

In step S101 of FIG. 7, the information acquisition unit 32 acquires the first coordinate values (the X-axis coordinate value Xt, the Y-axis coordinate value Yt, and the Z-axis coordinate value Zt) serving as the position information of the tool 16. It is assumed that the second coordinate values (the X-axis coordinate value Xc, the Y-axis coordinate value Yc, and the Z-axis coordinate value Zc) of the camera 31 are stored in an internal memory (not illustrated) of the image capturing apparatus 30 as fixed values.

In step S102, when the tool 16 is replaced, the direction and distance calculation unit 33 changes the Z-axis coordinate value Zt of the first coordinate values on the basis of the length L correlated with the tool number of the tool 16. The length L correlated with the tool number is acquired by the information acquisition unit 32. When the tool 16 is not replaced, step S102 is skipped, and the flow proceeds to step S103.

In step S103, the direction and distance calculation unit 33 calculates the direction of the optical axis OA connecting the camera 31 and the tip of the tool 16 and the distance d between the camera 31 and the tip T of the tool 16 on the optical axis OA on the basis of the first coordinate values of the tool 16 and the second coordinate values of the camera 31. In step S104, the attitude control unit 34 controls the attitude of the camera 31 so as to be parallel to the optical axis OA direction (the direction vector m) calculated in step S103.

In step S105, the imaging magnification setting unit 35 calculates the imaging magnification r of the tool 16 by the camera 31. Moreover, the imaging magnification setting unit 35 corrects the imaging magnification r on the basis of the zooming ratio r0 of the tool 16. The zooming ratio r0 of the tool 16 is acquired by the information acquisition unit 32. The imaging magnification setting unit 35 controls the zooming ratio of the camera 31 on the basis of the imaging magnification r calculated finally. After the process of step S105 ends, the process of this flowchart ends.

According to the machine tool 1 and the image capturing apparatus 30 of the present embodiment described above, the following advantages, for example, are obtained. The image capturing apparatus 30 of the present embodiment calculates the distance d and the direction of the optical axis OA connecting the camera 31 and the tip T of the tool 16 on the basis of the coordinate values of the camera 31 and the moving tool 16. The image capturing apparatus 30 controls the attitude of the camera 31 so as to be parallel to the direction (the direction vector m) of the optical axis OA and sets the imaging magnification r of the camera 31 on the basis of the distance d. Therefore, in the image capturing apparatus 30, the image of the tip T of the moving tool 16 can be captured in an optimal size on the screen in a state of being positioned at a central position of the screen.

In the image capturing apparatus 30 of the present embodiment, the control of the attitude and the imaging magnification r of the camera 31 is executed by a program different from the machining program of the machine tool 1. According to the execution method, since an operator does not need to input instructions related to control of the attitude and the imaging magnification r of the camera 31 using the commands of the machining program, it is possible to alleviate the workload of the operator. Moreover, in the image capturing apparatus 30 of the present embodiment, it is not necessary to change the machining program of the machine tool 1 in order to control the attitude and the imaging magnification r of the camera 31. Therefore, the image capturing apparatus 30 of the present embodiment can be easily applied to existing machine tools.

The image capturing apparatus 30 of the present embodiment changes the coordinate values (the Z-axis coordinate value Zt) of the tool 16 on the basis of the length L correlated with the tool number. Therefore, the image capturing apparatus 30 can capture the image of the tip T of the moving tool 16 in a state of being positioned at a central position of the screen even when the tool 16 is replaced and the length L of the tool 16 changes. The image capturing apparatus 30 of the present embodiment corrects the imaging magnification r of an image on the basis of the zooming ratio r0 correlated with the tool number. Therefore, the image capturing apparatus 30 can capture the image of the tip T of the tool 16 in an optimal size on the screen even when the length L of the tool 16 is the same and the tool diameter, a tip shape, or the like is different.

While embodiments of the present invention have been described, the present invention is not limited to the above-described embodiments, but various changes and modifications like the modified embodiments to be described later can be made, and these modified embodiments also fall within the technical scope of the present invention. The advantageous effects described in the embodiments are only exemplary ones of most preferable effects produced by the present invention, and the advantageous effects of the present invention are therefore not limited to those described in the above embodiments. The above-described embodiments and the modified embodiments to be described later can be used in appropriate combinations, and detailed description thereof will be omitted.

Modified Embodiment

In the embodiment, although the vertical machine tool 1 in which the tool 16 attached to the spindle head 12 moves in the up-down direction (Z-direction) has been described, the type of the machine tool is not limited to the above-described embodiment. The machine tool may be a horizontal machine tool in which a tool attached to the spindle head moves in a left-right direction (X-axis direction) or the front-rear direction (Y-direction). In the embodiment, although a tool for a machine tool has been described as an example of a moving target, the moving target is not limited to the above-described embodiment. The moving target may be an arm of a robot, for example, and may be a gripper attached to the arm, a welding gun, or the like.

In the embodiment, although an example in which the image capturing apparatus 30 has one camera has been described, the number of cameras is not limited to the above-described embodiment. A plurality of cameras may be disposed around the machine tool body 10 and the camera may be switched according to an imaging direction of the target. In the embodiment, although an example in which the attitude control unit 34 controls the attitude of the camera 31 so as to be parallel to the optical axis OA direction (the direction vector m) calculated by the direction and distance calculation unit 33 has been described, the control of the camera is not limited to the above-described embodiment. The attitude control unit 34 may control the attitude of the camera 31 so as to be tilted by a predetermined angle with respect to the optical axis OA direction.

EXPLANATION OF REFERENCE NUMERALS

1: Machine tool,
10: Machine tool body,
20: Numerical control device,
30: Image capturing apparatus,
31: Camera,
32: Information acquisition unit (Coordinate value acquisition unit, Length information acquisition unit, Zooming ratio acquisition unit),
33: Direction and distance calculation unit,
34: Attitude control unit
35: Imaging magnification setting unit

What is claimed is:

1. An image capturing apparatus comprising:
    a coordinate value acquisition unit that acquires first coordinate values serving as position information of a moving target;
    an image capturing unit that captures an image of the target;
    a direction and distance calculation unit that calculates a direction of an optical axis that connects the target and the image capturing unit and a distance between the target and the image capturing unit on the optical axis on the basis of the first coordinate values and second coordinate values serving as position information of the image capturing unit;
    an attitude control unit that controls an attitude of the image capturing unit on the basis of the calculated direction of the optical axis;
    an imaging magnification setting unit that sets an imaging magnification of the target in the image capturing unit on the basis of the calculated distance; and
    a zooming ratio acquisition unit that acquires a zooming ratio of the target correlated with an identification number of the target, wherein
    the imaging magnification setting unit corrects the imaging magnification on the basis of the zooming ratio, and
    the image of the moving target is captured while changing the imaging magnification of the target and the attitude of the image capturing unit.

2. The image capturing apparatus according to claim 1, further comprising:
    a length information acquisition unit that acquires length information of the target correlated with the identification number of the target, wherein
    the direction and distance calculation unit changes the first coordinate values on the basis of the length information of the target.

3. A machine tool comprising the image capturing apparatus according to claim 1.

* * * * *